United States Patent [19]
Travis

[11] Patent Number: 5,814,121
[45] Date of Patent: Sep. 29, 1998

[54] OXYGEN-GAS FUEL BURNER AND GLASS FOREHEARTH CONTAINING THE OXYGEN-GAS FUEL BURNER

[75] Inventor: Ian D. Travis, Waterville, Ohio

[73] Assignee: The BOC Group, Inc., New Providence, N.J.

[21] Appl. No.: 598,460

[22] Filed: Feb. 8, 1996

[51] Int. Cl.⁶ .............................. C03B 3/00; C03B 5/00; C03B 5/16; C03B 9/38
[52] U.S. Cl. ............................ 65/346; 65/335; 65/347; 65/356; 239/430; 239/433; 239/434.5
[58] Field of Search ........................ 65/335, 346, 347, 65/356, 134.4; 431/181, 187, 89; 239/430, 433, 434.5

[56] References Cited

U.S. PATENT DOCUMENTS

| | | | |
|---|---|---|---|
| 733,463 | 7/1903 | Dennison . | |
| 2,050,368 | 8/1936 | Neely | 229/115 |
| 2,378,346 | 6/1945 | Wigton | 239/430 |
| 2,397,349 | 3/1946 | Hartung | 239/430 |
| 2,657,650 | 11/1953 | Chouinard et al. | 110/22 |
| 3,217,986 | 11/1965 | Davis, Sr. et al. | 239/430 |
| 3,433,418 | 3/1969 | Hach, Jr. | 239/430 |
| 3,575,354 | 4/1971 | Hach, Jr. | 239/430 |
| 3,887,135 | 6/1975 | Tamai | 239/406 |
| 4,014,469 | 3/1977 | Sato | 239/404 |
| 4,216,908 | 8/1980 | Sakurai et al. | 239/132.3 |
| 4,335,677 | 6/1982 | Nagata et al. | 118/306 |
| 4,510,874 | 4/1985 | Hasenack | 239/433 |
| 4,525,175 | 6/1985 | Stellaccio | 48/86 |
| 4,604,123 | 8/1986 | Desprez et al. | 65/134 |
| 4,690,635 | 9/1987 | Coppin | 431/187 |
| 4,708,728 | 11/1987 | Desprez et al. | 65/136 |
| 4,986,748 | 1/1991 | Brown et al. | 431/188 |
| 5,092,760 | 3/1992 | Brown et al. | 431/10 |
| 5,143,297 | 9/1992 | De Michele et al. | 239/427 |
| 5,169,424 | 12/1992 | Grinnen et al. | 65/346 |
| 5,199,866 | 4/1993 | Joshi et al. | 431/353 |
| 5,227,017 | 7/1993 | Tanaka et al. | 159/4.01 |
| 5,251,823 | 10/1993 | Joshi et al. | 239/401 |
| 5,299,929 | 4/1994 | Yap | 431/8 |
| 5,307,996 | 5/1994 | Kataoka et al. | 239/424 |

FOREIGN PATENT DOCUMENTS

0573075 A1  8/1993  European Pat. Off. ........ C03B 5/235

OTHER PUBLICATIONS

A Collection of Papers Presented at the 54th Conference on Glass Problems; David L. Wilcox, Sr. and John Kieffer, Editors; Oct. 26–27, 1993; pp. 131–146.

Status Report on the Development of an Oxygen–Fuel Fired Forehearth; 54th Conference on Glass Problems; University of Illinois; Oct. 26–27, 1993; John T. Brown, William P. Coppin, Alan Stephens and Richard W. Marshall, authors; pp. 1–12.

*Primary Examiner*—Peter Chin
*Assistant Examiner*—Jacqueline A. Ruller
*Attorney, Agent, or Firm*—R. Hain Swope; Salvatore P. Pace

[57] ABSTRACT

An oxygen-gas fuel burner (12) for use in a refractory burner block (20) of glass distribution and conditioning channels (14) for thermally treating glass (18). The oxygen-gas fuel burner (12) includes a gas fuel conduit (26) extending to a central fuel outlet (28); an oxygen conduit (30) including a plurality of passages (30a) circumferentially spaced about the fuel conduit (26) and converging radially to oxygen outlets (32) circumferentially spaced about and concentric with the central fuel outlet (28); and a burner housing (34) including an outer nozzle (38). The outer nozzle (38) surrounds the fuel outlet (28) and the oxygen outlets (32) to provide a burner tip chamber (40) for mixing and combustion of oxygen and gas fuel to produce a flame within the burner tip chamber and extending outward from the burner tip chamber.

21 Claims, 2 Drawing Sheets

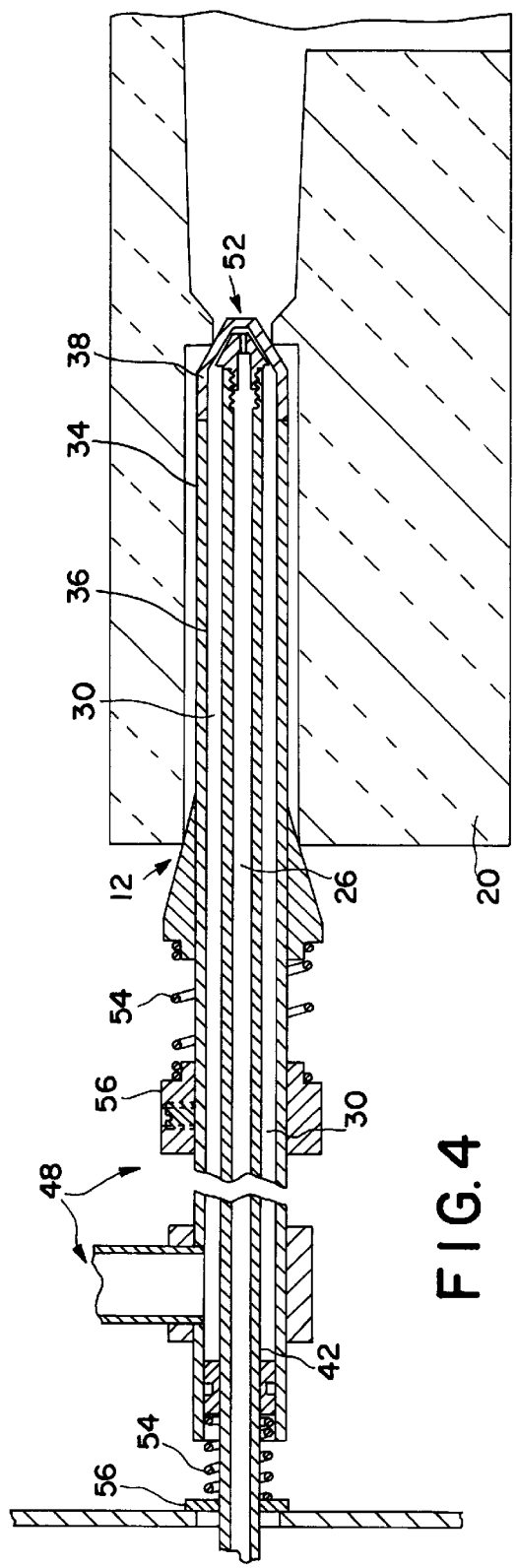
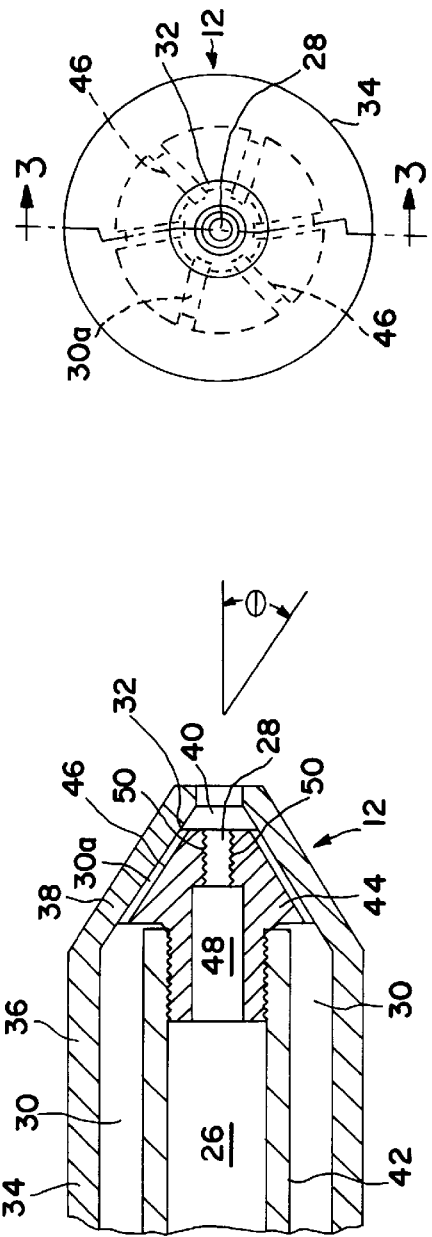

OXYGEN-GAS FUEL BURNER AND GLASS FOREHEARTH CONTAINING THE OXYGEN-GAS FUEL BURNER

FIELD OF THE INVENTION

The present invention relates to an oxygen-gas fuel burner for use in a refractory burner block of glass distribution and conditioning channels for thermally treating glass and the channel utilizing an oxygen-gas fuel burner. More particularly, the present invention relates to a glass forehearth including a burner designed to burn a fuel gas with oxygen to produce a flame of controlled length to supply heat in a controlled manner for thermally treating glass.

BACKGROUND OF THE INVENTION

As well known in the art, a glass forehearth typically includes an elongated channel defined by refractory sidewalls through which molten glass slowly flows by gravity from a glass furnace to a forming process, e.g., a glassware forming machine, for thermal conditioning. As the molten glass flows through the glass forehearth the molten glass is thermally conditioned by modifying the temperature of the glass at the entrance to the channel to a desired exit temperature and homogenizing the temperature of the glass so as to limit cross-sectional temperature gradients and to provide molten glass of a suitable temperature and viscosity to the forming process.

One known method of thermally conditioning the glass in the forehearth is to divide the glass forehearth into a series of sections or zones with each section or zone having one or more burners. The burners may selectively reheat the marginal areas of the molten glass flow and channel sidewalls to offset the more rapid cooling of the outer layers of the glass flow caused by heat losses through the outer walls, heat the channel sidewalls to prevent a temperature gradient from forming resulting in unwanted heat loss and, in addition, heat the entire glass volume under particular production requirements, e.g., a no-flow condition. Each burner of the forehearth is positioned within an opening of a refractory burner block along the sidewalls of the glass forehearth and is designed to fire out from the burner block into a combustion zone, i.e., the area between the forehearth sidewalls and above the glass, to provide a burner flame substantially within an envelop of the burner block to direct thermal energy downward toward the channel sidewalls and the molten glass flowing within the channel and/or, depending upon the forehearth design and/or production requirements, provide a burner flame within the combustion zone to direct heat to the glass forehearth channel center area.

Although the many known variations on glass forehearth and burner design have been proven to perform satisfactorily under certain circumstances, further improvements on glass forehearth and burner design are desired. For example, it is desirable to provide a glass forehearth capable of providing improved control of the thermal homogeneity of glass flow, increased capacity or pull rate, reduced volatilization in borosilicate and other volatile glass types and improved forehearth life in volatile glasses.

It will be appreciated that poor thermal homogeneity is typically caused by more heat conducting through the sides of the forehearth channel than is lost from the center of the channel thereby producing lower side glass temperatures than the glass in the center of the channel. Blowing cool air down the center of the glass forehearth within the combustion zone and improved side insulation assist in minimizing this condition, but at times it is difficult to elevate the side temperatures to or above the center glass temperature. This problem is exacerbated by the large volumes of hot products of combustion which may be exhausted into the space above the glass, reducing the effect of cooling air which may also be flowing within the same chamber.

In addition to the problem of poor thermal homogeneity, many glass manufacturers are attempting to increase their production speeds. Production speed increases may be accomplished in the forming operation by speeding up the forming machine, such as changing to double, triple and quad gob processes, or increasing the number of forming machine sections. This can require an increase in glass flow, or Pull Rate, which typically requires that the length and/or width of the forehearths be increased. Although the increase in the length of the forehearth is a rather nominal cost, the relocation of the drop or stream point results in machine and like relocation costs which can be excessive. The glass manufacturer must either absorb the cost of machine relocation or accept the operational problems of poorer thermal homogeneity. It will be appreciated that more thermally homogeneous glass is required to reduce the weight or increase the quality of the glass ware thereby resulting in greater productivity from a given furnace, lower costs to the customers and lower energy requirements per glass item.

In addition to the foregoing problems, it is known that volatile material in glass evaporates in proportion to the difference in it's partial pressures in the glass and the atmosphere above the glass. Because the combustion volume for an oxygen fuel burner is less than that for an equivalent amount of fuel combusted with air, the concentration of the volatile species is greater in the oxygen fuel combustion products. This reduces the volatilization rate in the oxygen-fuel forehearth which results in less loss of the volatile material from the glass. In the case of borosilicate glass, the loss of $B_2O_3$ from the glass surface results in an enrichment of silica in the surface glass. This, in turn, can result in silica crystallization on the glass surface which produces a solid material which can cause problems in the delivery of the glass to the forming process or quality defects in the finished product.

An oxygen-gas fuel burner for a glass forehearth in accordance with the present invention is intended to address some or all of the problems of the prior art and in particular, those glass distribution and conditioning channels including air-gas fuel burners. It will be appreciated that an oxygen-gas fuel burner can provide an equivalent or greater amount of heat for transfer to the glass in a shorter distance from the channel sidewalls than air-gas fuel burners, because of the lower mass flow rate, of the gases, shorter flame length due to increased combustion rate and the higher radiative heat transfer resulting from higher flame temperature.

It is known that an oxygen-gas fuel burner will exhaust a lower volume of products of combustion, than an air-gas fuel burner.

The total volume of exhaust gases from an air-gas fuel combustion system can be approximated as follows:
Total Volume=1 part gas +2 parts oxygen +8 parts nitrogen
Total Volume=11 parts by volume The total volume of exhaust gases in an oxygen-fired combustion system can be approximated as follows:
Total Volume=1 part gas+2 parts oxygen
Total Volume=3 parts by volume Assuming an adiabatic system, oxygen-gas fuel combustion can result in as much as a 33% reduction in fuel requirement to raise the temperature of the exhaust gases. Therefore the total volume of exhaust gases will be reduced as follows:

Total Volume=3 parts×0.7 (Approximately 1 part saved)
Total Volume=2 parts by volume (After accounting for fuel savings)

Therefore, the overall reduction of exhaust gas volume can be approximated as follows:
Volume reduction=[(11−2)/11 ]×100
Volume reduction=82%

The lower volumetric flow of exhaust gases, moving at a slower velocity, does not have as large a heating effect on the cooling air, directed down the centerline of the forehearth roof. Nor does it have enough momentum to deflect the flow of the cooling air. This increases the effectiveness of the cooling air in lowering the center roof refractory temperature and increasing radiative heat losses from the center of the glass flow.

In addition, it is believed that the pull rate of a glass forehearth can be increased through the following phenomena: (1) increase in the effectiveness of the cooling air due to the reduced volume of combustion gases entering the cooling chamber as discussed above, and (2) an increase in the effective glass residence time of the forehearth, thus permitting additional increase in the effective cooling rate. Glass residence time is a major design parameter of a forehearth. Glass residence time is normally considered as the time (in minutes) it takes for a glass cross-section to move from the entrance of the forehearth to the spout as a plug, hence "plug flow".

The relationship of "plug flow" residence time to forehearth performance is determined by operational rather than by theoretical calculation, i.e., the critical minimum residence time for a given design of forehearth is determined as the time before which an incremental increase in pull rate results in poor thermal homogeneity. In actual practice, it is well known that the center glass may move through the forehearth in much less time than the residence time calculated assuming plug flow. Although this is partially caused by the friction at the refractory interface, the major reason is the flow resistance due to the higher glass viscosity. The side glass heat is conducted through the channels and becomes lower in temperature and, therefore, higher in viscosity. This effect compounds itself by the sidewall resistance slowing the glass velocity, which permits more heat to transfer, which cools the glass more, which increases the viscosity, which slows the glass more, which conducts more heat, etc.

It is believed that oxygen-fuel gas burners are effective at heating the sidewalls of the forehearth such that the side glass velocity will increase. Increased side glass velocity implies reduced center glass velocity, for the same volume flow of glass and allows more time for the cooling air to influence or reduce the center glass temperature. As a result, the forehearth may operate at an elevated inlet temperature for a given tonnage or permit an increase in the pull rate for a given inlet temperature.

With regard to reduced glass volatilization, it is believed that the lower volume of products of combustion also increases the concentration of volatile materials above the glass which also may reduce the evaporation rate of volatile materials. Moreover, it is also believed that the lower velocity of exhaust gases flowing over the glass will reduce the amount of volatilization In view of the foregoing, it is an object of the present invention to provide an oxygen-gas fuel glass forehearth burner which will produce a controlled flame length. Another object of the present invention is to provide an oxygen-gas fuel burner wherein a majority of the thermal energy from the burner flame is released under an arch of a burner block within an envelop of the burner block. Yet another object of the present invention is to provide an oxygen-gas fuel burner wherein the flame does not project excessively beyond the periphery of the burner block. Still another object of the present invention is to provide an oxygen-gas fuel burner to efficiently heat the channel sidewalls and the marginal areas of the glass flow by re-radiation. Another object is to provide heat to the whole of the forehearth glass volume in order to maintain temperatures during certain production requirements, as such the flame need not be limited to releasing heat within the burner block but may be required to project it beyond the narrow area at the side of the glass, which is normally required to be heated. Another object of the present invention is to provide an oxygen-gas fuel burner that is simple and economical to operate and/or manufacture.

Although the burner in accordance with the present invention has been primarily described in connection with a glass forehearth it will be readily apparent that the present invention may be used with equal facility on non-center line cooled forehearths such as those used in fiberglass production and as a burner for a distributor, a refiner, a melter and the like and the description of the same in relation to a glass forehearth is not to be construed as a limitation on the scope of the invention.

SUMMARY OF THE INVENTION

Briefly, according to this invention, there is provided a glass forehearth and an oxygen-gas fuel burner for use in glass distribution and conditioning channels, such as a spout, refiner, distributor and glass forehearth, for thermally conditioning glass. For example, referring to the forehearth embodiment, the glass forehearth includes an elongated channel having refractory sidewalls and a plurality of burners positioned within separate refractory burner blocks forming a portion of the sidewalls of the glass forehearth. The oxygen-gas fuel burner may be designed to provide a burner flame substantially within an envelop of a burner block to direct thermal energy downward within the channel and adjacent glass.

The oxygen-gas fuel burner includes a gas fuel conduit extending to a central fuel outlet; an oxygen conduit circumferentially spaced about the fuel conduit and converging radially to oxygen outlets circumferentially spaced about and concentric with the central fuel outlet; and a burner housing including an outer nozzle. The outer nozzle surrounds the fuel outlet and the oxygen outlets to provide a burner tip chamber for mixing and combustion of oxygen and gas fuel to produce a flame within the burner tip chamber and extending outward from the burner tip chamber substantially within the refractory burner block of the glass distribution and conditioning channels.

BRIEF DESCRIPTION OF THE DRAWINGS

Further features and other objects and advantages of the invention will become clear from the following detailed description made with reference to the drawings in which:

FIG. 2 is a front view of an oxygen-gas fuel burner in accordance with the present invention;

FIG. 3 is a partial cross-sectional taken along line 3—3 of the oxygen-gas fuel burner shown in FIG. 2; and FIG. 4 is a cross-sectional view of an oxygen-gas fuel burner within a refractory burner block in accordance with another embodiment of the present invention.

DESCRIPTION OF THE PREFERRED EMBODIMENTS

Figure 1:
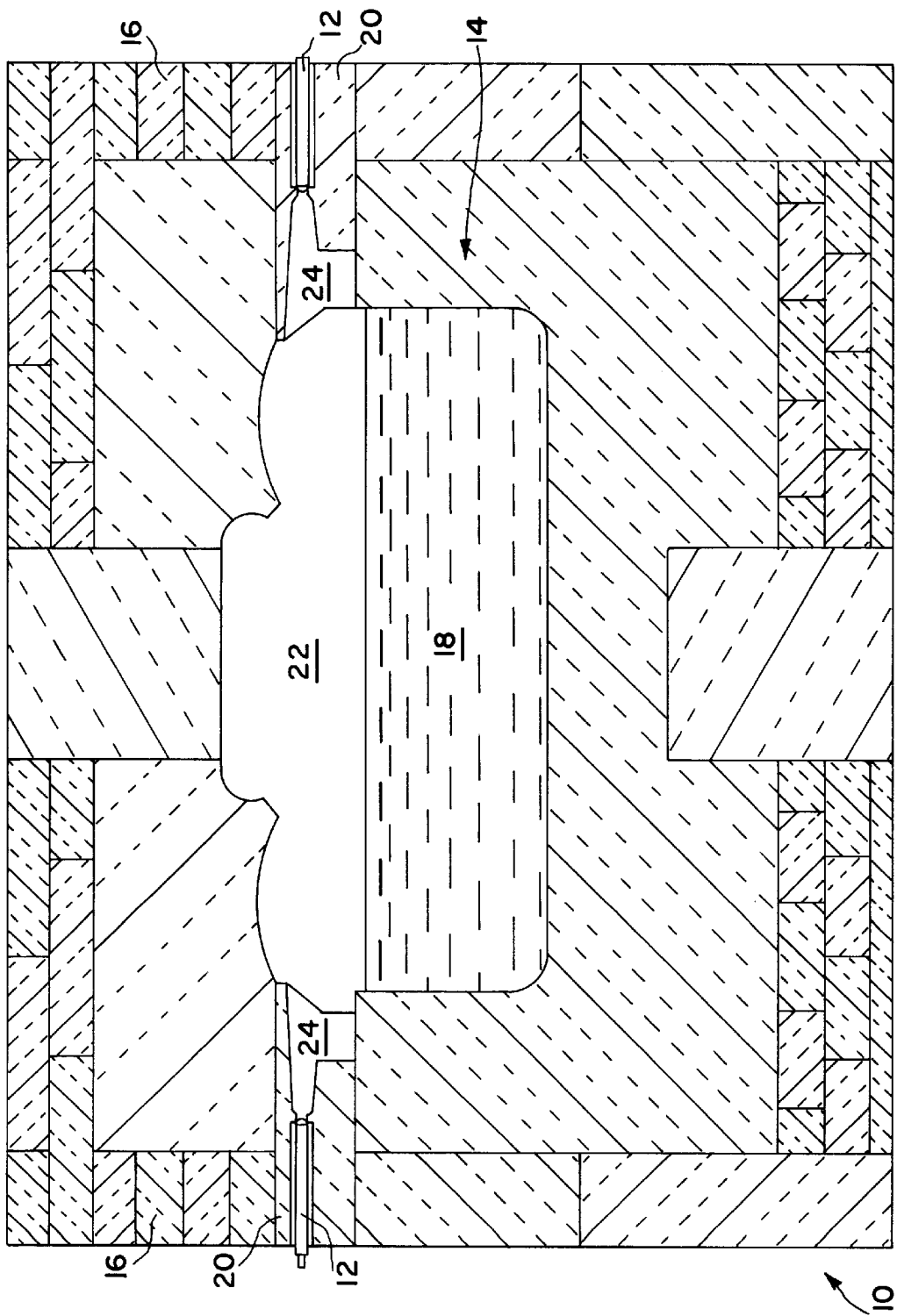
FIG. 1 is a cross-sectional view of a glass forehearth including an oxygen-gas fuel burner in accordance with the present invention.

Referring to the drawings, wherein like reference characters represent like elements, FIGS. 1–4 illustrate, by way of example, a glass forehearth 10 and a plurality of oxygen-gas fuel burners 12 in accordance with the present invention. The glass forehearth 10 typically includes an elongated channel 14 defined by refractory sidewalls 16 through which molten glass 18 slowly flows by gravity from a glass furnace (not shown) to a forming process (not shown), e.g., a glassware forming machine, for thermal treatment. As the molten glass 18 flows through the glass forehearth 10 the molten glass is thermally treated.

The burners 12 of the glass forehearth 10 are positioned within refractory burner blocks 20 located along the sidewalls 16 of the glass forehearth and are designed to fire out from the burner block into a combustion zone 22. Depending upon the desired effect, the burner 12 may produce a flame that is substantially within an envelop 24 of a burner block 20 to direct thermal energy downward toward the channel sidewalls 16 and molten glass 18 flowing within the channel 14 between the sidewall.

In considering the figures, it will be appreciated that for purposes of clarity, certain details of construction and operation of the forehearth 10 and burners 12 may not have been provided in view of such details being conventional and well known within the skill of the art once the invention is disclosed and explained. For further information regarding forehearth and burner design and operation reference is made to U.S. Pat. No. 5,358,541 and U.S. Pat. No. 4,604,123 and the glass making literature in general.

Referring to FIGS. 1–4, the glass forehearth burners 12 in accordance with the present invention are designed to burn a fuel gas with oxygen to supply heat in a controlled manner to the surrounding refractories and to the molten glass 18 which may flow within refining, conditioning and distribution channels, e.g., the glass forehearth, distributor, refiner, melter. The fuel gas may be most any suitable gaseous hydrocarbon such as methane and the like. The fuel gas is supplied to the burner 12 from a fuel source (not shown) through a gas fuel conduit 26 which extends to a central fuel outlet 28. Oxygen is supplied to the burner from an oxygen source (not shown) through an oxygen conduit 30. The oxygen conduit 30 is circumferentially spaced about the fuel conduit 26 and includes a plurality of passages 30a which converge radially to oxygen outlets 32. As shown in FIG. 3 and 4, the oxygen outlets 32 are at the forward end of the passages 30a and are aligned with the forward end of the fuel outlet 28. The passages 30a may be offset at an angle from a radial line and angled with respect to a longitudinal central axis of the burner 12 to swirl the oxygen flow and provide increased turbulent mixing of the oxygen and fuel gas upon exit from the oxygen outlets 32 and fuel outlet 28.

The outermost member of the burner 12 is a burner housing 34. The burner housing 34 has a cylindrical body 36 tapering to an outer nozzle 38. The outer nozzle 38 is of a conical shape and surrounds and encloses the fuel outlet 28 and the oxygen outlets 32 to provide a burner tip chamber 40 wherein gas fuel and oxygen converge, mix and combust to produce a flame within the burner tip chamber and extending outwardly therefrom such that the flame is of a stable shape and anchored to the tip chamber. The reduced diameter outlet of the outer nozzle 38 prevents contaminants and the like from entering the burner tip chamber 40 and interfering with the fuel outlet 28. In addition, the conical shape of the outer nozzle 38 presents a reduced surface area exposed to radiant heat from the combustion space 22 within the channel thereby prolonging the life of the burner 12.

The burner housing 34 and other components of the burner 12 may be formed of most any suitable material to resist the deleterious effects of combustion and the high temperature environment. Suitable materials for the burner 12 include high temperature, corrosion resistant nickel alloys, e.g. Inconel 600, stainless steels or ceramics and the like.

As shown in FIGS. 2 and 3, the fuel outlet 28 and oxygen outlets 32 are defined by passageways formed in part by an inner tubular member 42 which extends longitudinally within the cylindrical body 36 of the burner housing 34 and an inner nozzle 44 which fits within the burner housing and against the interior surface of the outer nozzle 38.

The inner tubular member 42 is of a hollow cylindrical shape and has a longitudinal central axis which is coincident with a longitudinal central axis of the burner housing 34. Sidewalls of the inner tubular member 42 and an interior wall of the burner housing 34 cooperatively define an annular space therebetween that functions as a portion of the oxygen conduit 30. Correspondingly, the space within the hollow cylindrical inner tubular member 42 functions as a portion of the gas fuel conduit 26.

Operatively connected to an end of the inner tubular member 42 is the inner nozzle 44. For ease of assembly and maintenance and to provide an adequate seal, the inner nozzle 44 is preferably threaded onto the inner tubular member 42. However, it will be appreciated that the inner nozzle 44 may be connected to the inner tubular member 42 in most any suitable manner. The inner nozzle 44 has a tapered conical shape forward face which is positioned adjacent the inner surface of the burner housing 34. The angle of taper of the forward face θ of the inner nozzle 44 is approximately 30 degrees and may range from about 15 degrees to 78 degrees. In a preferred embodiment, the forward face of the inner nozzle 44 is tapered at an angle corresponding to the tapered angle of the outer nozzle 38 of the burner housing. The conical shape of the outer nozzle 38 of the burner housing 34 allows the inner nozzle 44 to self center in the nozzle thereby obviating the need for any other centering device or spacing supports between the cylindrical body 36 and inner tubular member 42. The conical shape of the outer nozzle 38 also allows the burner 12 to self center in a typical refractory block 20, aiding sealing and mounting.

Formed within the tapered forward face of the inner nozzle 44 are grooves 46 spaced circumferentially about the inner nozzle. Each groove 46 of the inner nozzle 44 and the inner surface of the outer nozzle 38 cooperatively form passages 30a of the oxygen conduit 30 extending to the oxygen outlet 32 when the inner nozzle 44 is installed flush against the interior surface of the outer nozzle 38 as previously described thereby facilitating tight tolerance control of the diameter or cross-sectional area of the oxygen outlets 32. The end of the grooves 46 and the inner surface of the outer nozzle 38 thus becomes a series of oxygen outlets 32 arranged radially around the fuel outlet 28. The grooves 46 extend radially from the outer diameter of the inner nozzle 44 to the innermost diameter of the inner nozzle. In a preferred embodiment, the grooves 46 are offset at an angle from a radial line and angled with respect to a longitudinal central axis of the burner 12 to swirl the oxygen flow and provide increased turbulent mixing of the oxygen and fuel gas upon exit from the oxygen outlets 32 and fuel outlet 28. In addition, the flow of oxygen around the conical inner nozzle 44 acts to cool the inner nozzle and outer burner housing 34 to reduce fuel cracking (carbon deposits).

It will be appreciated that the design of the passage 30a of the present invention allows for use of precision machining procedures to provide the desired flow/pressure characteristics of the oxygen-gas fuel burner believed not otherwise obtainable by centering a tube within a tube.

The inner nozzle 44 includes a gas fuel opening 48 extending the axial length of the nozzle and exiting the nozzle at the fuel outlet 28. The gas fuel opening 48 in cooperation with a portion of the hollow cylindrical inner tubular member 42 forms the gas fuel conduit 26 to supply fuel to the fuel outlet 28. As shown in FIG. 3, the internal diameter of the gas fuel opening 48 of the inner nozzle 44 decreases in the direction of gas fuel flow to provide a constricted passage and increased velocity of gas fuel flow. The gas fuel opening 48 may include a means 50 for creating turbulent flow of the gas fuel from the fuel outlet 28. In one embodiment, the means for creating turbulent flow 50 is a threaded portion on the inside surface of the gas fuel opening 48. However, most any suitable means may be used to create turbulent flow of the gas fuel such as flow deflectors and the like. Fuel and oxygen are supplied to the rear of the concentric cylindrical body 36 and inner tubular member 42, respectively, through separate manifolds 48 as well known in the art.

The burner 12 may be simply and efficiently operatively assembled by forcing the inner tubular member 42 and inner nozzle 44 within the housing 34 and into contact with the outer nozzle 38. In a preferred embodiment, referring to FIG. 4, because of the unique burner configuration, the burner 12 may be operatively assembled by forcing the burner housing 34 into contact with the defining edge of an opening 52 within the burner block 20 and by forcing the inner tubular member 42 and inner nozzle 44 within the burner housing 34 and into contact with the interior surface of the outer nozzle 38 by means of a preloading device. The preloading device includes at least one spring 54. In a preferred embodiment, the preloading device includes at least two springs 54 respectively operatively positioned between a fixed bearing surface 56 and the housing 34 and between a fixed bearing surface 56 and the inner tubular member 42. The springs 54 force the burner 12 within the center of the opening 52 within the refractory burner block 20 and center the nozzles 38 and 44 and allow for differential thermal expansion of the cylindrical body 36 and inner tubular member 42 to take place without affecting the sealing or centering of the nozzles.

In one typical use, the forward end of the burner housing 34 is positioned within an opening 52 formed within the refractory burner block 20 in the side of the forehearth 10 above the molten glass 18. The axis of the burner 12 is positioned generally perpendicular to the direction of glass flow. Oxygen exiting the oxygen outlets 32 may be mixed with the fuel gas exiting the fuel outlet 28 in a controlled manner such that radial convergence of the flow paths allows good mixing and controlled flame length over a wide range of flows. Upon mixing of the oxygen and fuel within the burner tip chamber 40 and ignition from a suitable source, combustion occurs and a flame is produced within the burner tip chamber. As the flow rate increases to the burner 12 the flame extends from the burner tip chamber 40 and does not "blow off" of the burner tip as typically experienced with comparable nozzles. The resulting flame from the burner tip chamber 40 provides heat to radiate into the glass and surrounding refractory material 16.

In accordance with the present invention, to prevent the flame from blowing off of the tip it has been found that the burner 12 must be ignited at sufficiently low flow rates such that the flame commences from within the burner tip chamber 40 and is anchored within the burner tip chamber. Ignition of the burner at flow rates greater than approximately 4 SCFH (0.113 m$^3$/hr) of gas fuel and 8 SCFH (0.226 m$^3$/hr) of oxygen, dependent on the specific sizing of the burner passages and orifices, causes the flame to form or commence outside of the burner tip chamber 40 such that the flame may subsequently blow off of the tip at increasing flow rates. Consequently, in accordance with the present invention it has been found that if a flame is formed within the burner tip chamber 40, the flow rates of the burner 12 may be appreciably increased over prior glass burner designs, e.g., more than 8 SCFH (0.226 m$^3$/hr), and the flame will not blow off the burner tip. An oxygen-gas fuel burner 12 in accordance with the present invention operates in a flow range of about 2–15 SCFH (0.057–0.425 m$^3$/hr) fuel gas and 4–30 SCFH (0.113–0.849 m$^3$/hr) oxygen gas at pressures between about 0.5–25 in. of water column (11.24–562.275 N/m$^2$) at room temperature. Moreover, the burner 12 in accordance with the present invention has been found capable of operating over a 50:1 (maximum flow rate of fuel:minimum flow rate of fuel) turndown range. The flame produced by the oxygen-gas fuel burner 12 in accordance with the present invention is capable of releasing a majority of the thermal energy thereof under the arch or envelop 24 of the burner block 20 of a glass forehearth such that the flame does not project beyond the burner block excessively under normal firing conditions, i.e., between about 2–6 SCFH (0.057–0.0.17 m$^3$/hr). The flame may also extend outside the burner block 20 and not move away from the burner tip chamber 40 during periods of high flow rates such as more than 8 SCFH (0.226 m$^3$/hr).

The invention will be further clarified by a consideration of the following example, which is intended to be exemplary of the use of the invention.

EXAMPLE 1

A burner in accordance with the present invention was tested in a rectangular furnace. The furnace was designed to approximate the combustion space in front of a burner block and between the roof of a forehearth and the glass surface at the side of the forehearth channel. The kiln was preheated to more than 800° C. and then the burner was inserted into the kiln. The burner produced an oxygen flow within the housing 34 and through angled grooves 46 and converged radially with a central gas fuel stream. The burner was run from about 2–15 SCFH (0.057–0.425 m$^3$/hr) fuel gas and 4–30 SCFH (0.113–0.849 m$^3$/hr) oxygen gas, in stoichiometric ratio, recording pressure versus flow and qualitative comments regarding flame shape and suitability. The gas and oxygen pressures were approximately equal. The burner was left running at about 8 SCFH (0.226 m$^3$/hr) of fuel gas and 16 SCFH (0.453 m$^3$/hr) of oxygen gas for at least two hours while a temperature profile across the floor of the kiln was recorded together with the block temperature.

The burner in accordance with the present invention produced a laminar flame inside the block at flows from about less than 1 SCFH (0.028 m$^3$/hr) to about 3 SCFH (0.085 m$^3$/hr). Between 3–3.6 SCFH (0.085–0.102 m$^3$/hr) the laminar flame extended slightly out of the burner block but still heated the burner block arch. It was noted that at approximately 14% excess oxygen a turbulent mixing pattern of the fuel and oxygen was produced. At 3.6 SCFH (0.102 m$^3$/hr) the flow became turbulent and the flame retracted inside the block. The primary heat release area was under the arch at the end of the tunnel for flows up to 15

SCFH (0.425 m³/hr). While the tunnel was very hot at the highest flow rates, the arch was also heated.

Plots of temperatures measured in the floor and block were compared for oxygen-gas-fuel burners of slightly differing designs and a conventional air-gas fuel burner, with a 25% higher fuel flow rate. These plots show that the oxygen-gas fuel burners release proportionally more of the available energy under the arch of the burner block near the block exit and that they deliver proportionally more of their energy to the floor of the chamber near the burner block exit, than the air-gas fuel burner, which projects a large proportion of it's energy release across the furnace, due to the higher volume flow and momentum of the gases and the slower combustion rate.

It was observed during testing that additional benefits of the burner design are the small nozzle surface area presented to radiation in the forehearth and the cooling effect of oxygen flowing over the inner nozzle 44. The inner nozzle 44 showed no signs of heat damage or fuel cracking after several hours of running. The burner provided the flame shape, flow rates and back pressures required for installation in new glass forehearth burner blocks and for retrofit to standard forehearth burner blocks and working end burner blocks.

The patents, patent applications and documents referred to herein are hereby incorporated by reference.

Having described presently preferred embodiments of the invention, it is to be understood that it may be otherwise embodied within the scope of the appended claims.

What is claimed is:

1. An oxygen-gas fuel burner having an inner and outer nozzle for use in a refractory burner block of glass distribution and conditioning channels for thermally treating glass, the oxygen-gas fuel burner comprising:
   a burner housing, said burner housing having a gas fuel conduit extending to a central fuel outlet of an inner fuel nozzle, an outer nozzle of a conical shape having an outer and inner surface; said inner nozzle having an outer surface and a central fuel outlet in communication with said gas fuel conduit, said inner nozzle having a forward conforming to said inner surface of said outer nozzle, said inner nozzle having a plurality of grooves circumferentially spaced in said forward face, said grooves and said inner surface define a plurality of passages having an upstream end communicating with an annular oxygen conduit defined by the inner wall of the outer nozzle and an outer wall of an inner tubular member of said fuel conduit; said outlet of said inner nozzle and downstream end of said passages communicate with a burner tip chamber defined by a portion of said outer nozzle and the surface of said inner nozzle in communication with said outer nozzle outlet.

2. The oxygen-gas fuel burner of claim 1 wherein said passages are offset at an angle from a radial line and angled with respect to a longitudinal central axis of said burner to provide increased turbulent mixing of the oxygen and fuel gas upon exit from said oxygen outlets and fuel outlet.

3. The oxygen-gas fuel burner of claim 1 wherein said burner housing includes a cylindrical body extending from said outer nozzle.

4. The oxygen-gas fuel burner of claim 3 wherein said inner tubular member is of a hollow cylindrical shape and has a longitudinal central axis which is coincident with a longitudinal central axis of said burner housing, a sidewall of said inner tubular member and a sidewall of said burner housing cooperatively define an annular space therebetween that functions as a portion of said oxygen conduit.

5. The oxygen-gas fuel burner of claim 4 wherein a space within said hollow cylindrical tubular member functions as a portion of said gas fuel conduit.

6. The oxygen-gas fuel burner of claim 5 wherein said inner nozzle is operatively connected to an end of said inner tubular member.

7. The oxygen-gas fuel burner of claim 5 wherein said inner nozzle is threaded to said inner tubular member.

8. The oxygen-gas fuel burner of claim 5 wherein said inner nozzle has a conical shape forward face positioned adjacent said burner housing inner surface.

9. The oxygen-gas fuel burner of claim 8 wherein said forward face of said inner nozzle is tapered at an angle of approximately 30 degrees.

10. The oxygen-gas fuel burner of claim 8 wherein said forward face of said inner nozzle is tapered at an angle corresponding to an angle of taper of an interior surface of said outer nozzle of said burner housing to allow said inner nozzle to self center in said outer nozzle.

11. The oxygen-gas fuel burner of claim 10 wherein said conical shape of said outer nozzle allows said burner to self center in the refractory block.

12. The oxygen-gas fuel burner of claim 3 wherein said inner nozzle includes grooves spaced circumferentially within a tapered forward face of said inner nozzle.

13. The oxygen-gas fuel burner of claim 12 wherein said grooves are offset at an angle from a radial line and angled with respect to a longitudinal central axis of said burner to provide increased turbulent mixing of the oxygen and fuel gas upon exit from said oxygen outlets and said fuel outlet.

14. The oxygen-gas fuel burner of claim 13 wherein said inner nozzle includes a gas fuel opening extending said inner nozzle length to said fuel outlet.

15. The oxygen-gas fuel burner of claim 14 wherein said gas fuel opening is in communication with said hollow cylindrical inner tubular member.

16. The oxygen-gas fuel burner of claim 15 wherein said gas fuel opening internal diameter decreases in the direction of gas fuel flow to provide a constricted passage and increased velocity of gas fuel flow.

17. The oxygen-gas fuel burner of claim 16 wherein said gas fuel opening includes a means for creating turbulent flow of the gas fuel from said fuel outlet.

18. The oxygen-gas fuel burner of claim 17 wherein said means for creating turbulent flow includes a threaded portion on the interior surface of said gas fuel opening.

19. The oxygen-gas fuel burner of claim 3 further comprising a preloading device for forcing said inner tubular member and said inner nozzle within said housing into contact with said outer nozzle.

20. The oxygen-gas fuel burner of claim 19 wherein said preloading device includes at least one spring.

21. A glass forehearth for thermally conditioning glass, the glass forehearth comprising;
   a) an elongated channel having refractory sidewalls; and
   b) a plurality of burners positioned within refractory burner blocks forming a portion of the sidewalls of the glass forehearth, each burner comprising;
      a burner housing, said burner housing having a gas fuel conduit extending to a central fuel outlet of an inner fuel nozzle, an outer nozzle of a conical shape having an outer and inner surface; said inner nozzle having an outer surface and a central fuel outlet in communication with said gas fuel conduit, said inner nozzle having a forward conforming to said inner surface of said outer nozzle, said inner nozzle having a plurality of grooves circumferentially spaced in said forward face, said grooves and said inner surface define a plurality of passages having an upstream end communicating with an annular oxygen conduit defined by the inner wall of the outer nozzle and an outer wall of an inner tubular member of said fuel conduit; said outlet of said inner nozzle and downstream end of said passages communicate with a burner tip chamber defined by a portion of said outer nozzle and the surface of said inner nozzle in communication with said outer nozzle outlet.

* * * * *